United States Patent Office 3,810,803
Patented May 14, 1974

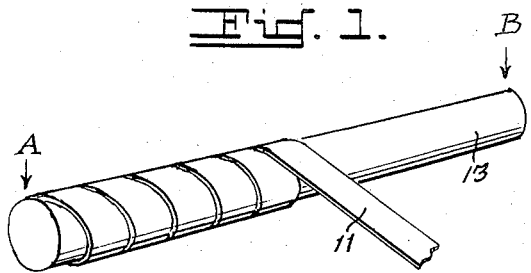
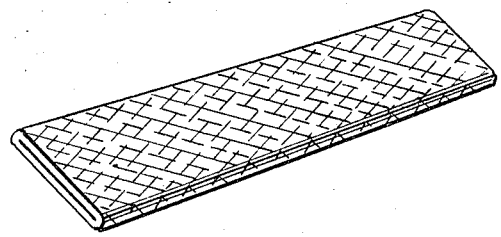
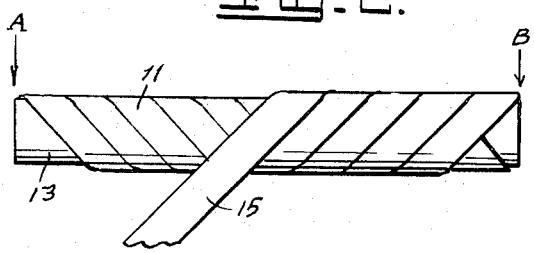
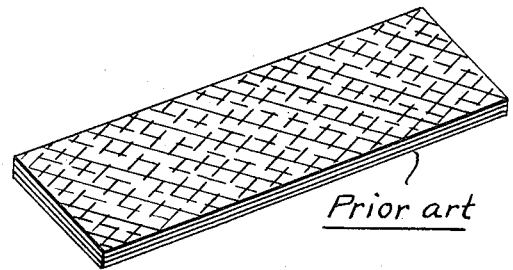
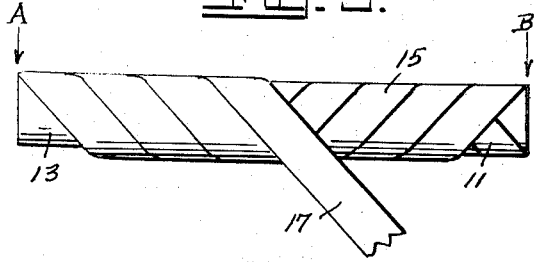
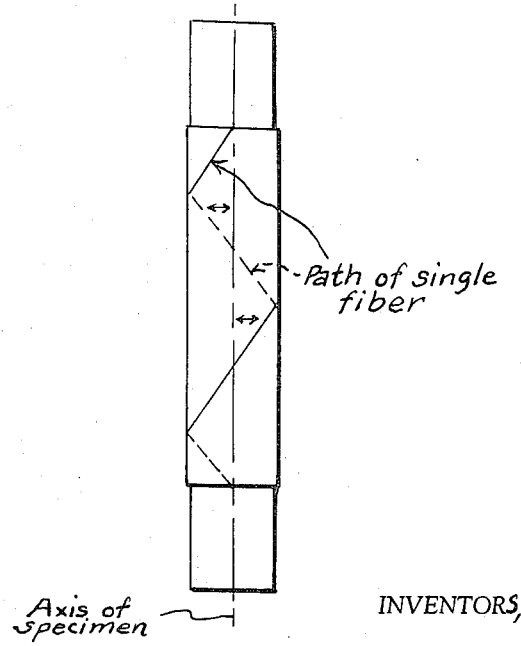

3,810,803
CONTINUOUS FIBER REINFORCEMENT,
CROSS-PLY TEST SPECIMEN
Bernard L. Karp, Hampton, and Irving E. Figge, Newport News, Va., and Ernest B. Paxson, Jr., Provo, Utah, assignors to the United States of America as represented by the Secretary of the Army
Filed Nov. 5, 1971, Ser. No. 195,956
Int. Cl. B31c 1/00
U.S. Cl. 156—190  6 Claims

ABSTRACT OF THE DISCLOSURE

A continuous fiber reinforcement cross-poly test specimen and method of fabrication, comprising the positioning of alternate plies of a unidirectional preimpregnated fiberglass tape on a mandrel at angles of ±45° orientation in relation to the axis of the specimen, and curing to obtain a continuous fiber specimen.

The invention described herein may be manufactured, used, and licensed by or for the Government for governmental purposes without the payment to us of any royalty thereon.

This invention relates to a continuous fiber reinforcement cross-ply test specimen.

It is often desirable to evaluate the strength of panels of certain constructions such as aircraft, containers, etc., utilizing a test panel of an anologous material. Prior art tensile specimens were fabricated in flat layers with alternate plies or laminations, oriented as required. The specimens' edges are then cut to obtain a specified width. However, this method produces a specimen that has short fibers which terminate at the edge and are not continuous from grip end to grip end of the specimen. Tensile tests on the prior art tensile specimens indicate lower ultimate strengths and non-uniform stress distribution because of the non-continuous fibers in comparison with an analogous panel in an original construction.

In distinction from the prior art tensile specimens, the fibers of the present invention are continuous from one end of the specimen to the other. This results in a tensile specimen capable of giving accurate evaluation of a panel in its original construction.

It is an object of this invention to provide and disclose a novel tensile specimen.

It is a further object of this invention to provide and disclose a novel tensile specimen having continuous fibers.

It is a further object of this invention to provide and disclose a method for the fabrication of a novel tensile specimen.

It is a further object of this invention to provide and disclose use of panels having continuous fibers as tensile specimens.

Other objects and a fuller understanding of the invention may be ascertained by referring to the following description and claims taken in conjunction with the accompanying drawing in which:

FIG. 1 depicts a mandrel partially wrapped with a single layer of Mylar tape.

FIG. 2 depicts a single layer of unidirectional fiberglass tape partially wrapped over the Mylar tape commencing in the opposite direction.

FIG. 3 depicts a second layer of unidirectional fiberglass tape partially wrapped over the first layer of fiberglass tape commencing in the opposite direction in relation to the first layer of fiberglass tape.

FIG. 4 depicts a third layer of unidirectional fiberglass tape partially wrapped over the second layer of fiberglass tape commencing in the opposite direction of the second layer of fiberglass tape.

FIG. 5 depicts a continuous tensile fiber specimen of the present invention.

FIG. 6 depicts a prior art cut edge tensile specimen.

FIG. 7 depicts the orientation angle, i.e., ±45°, of a single strand of fiber in relation to the axis of the specimen.

Referring now to FIG. 1 of the drawings, a 0.002" thick tape known in the trade as Mylar (polyethylene terephthalate resin by E. I. du Pont) and designated 11, having a width of ¾", is wrapped in a closed helix around the highly polished and waxed surface of cylindrical mandrel 13 having a diameter of 0.562". The ends of mandrel 13 are designated A and B. Unidirectional fiberglass tape 15 having a thickness of 0.0085" and a width of 1.257" is then wrapped in a closed helix over Mylar tape 11, commencing from end B of mandrel 13 as shown in FIG. 2. The step is repeated utilizing unidirectional tapes 17 and 19 as shown in FIGS. 3 and 4. The dimensions of the unidirectional tapes illustrated in FIGS. 3 and 4 have a thickness of 0.0085", and a width of 1.302" and 1.346", respectively. Each layer of ply of tape is succeedingly wider to maintain the desired angle between the fibers of each layer. In addition, each ply is alternated, i.e., wrapped in an opposing direction to the preceding layer. This technique places alternate plies of fabric at orientation angles of ±45° in relation to the axis of the specimen as illustrated in FIG. 7. The width of the unidirectional tape utilized is a function of the desired angle and mandrel diameter, in accordance with the following equation:

$$W = (D + 2t)O$$

wherein:

$D$ = diameter of mandrel
$t$ = Mylar thickness
$O$ = cosine of ½ the angle between the cross-plies, i.e., ±45°

Since each successive layer increases the diameter of the specimen by two times, a new calculation must be made for the width of each successive layer of tape. Providing the initial diameter of the mandrel is not too small, as many layers of fiberglass tape may be used as desired, depending on the final tensile specimen thickness required.

A layer or wrapper of waxed paper is applied over the uncured wound specimen to protect it from dust or distortion of the filaments. The entire package is then removed from the mandrel. Subsequently, the Mylar tape is removed from the uncured wound specimen. The hollow wound fiberglass tape pacakage is placed in a pre-heated press at the required pressure and temperature for the specific type of tape and resin system, and allowed to cure for the recommended time as per manufacturer's procedure specifications. The specimen is then complete and need only be adapted to a test fixture for evaluation. In the present example, the obtained round hollow core material was pressed flat and cured at about 325° F. for a period of 30 minutes. The flat cured material was post cured in an oven for 2 hours at a temperature of about 350° F.

An Instron Tensile Test Machine was utilized to evaluate the tensile specimens. Of 30 specimens evaluated, tensile tests indicate that the ultimate strengths of the present continuous fiber type specimens are aproximately 50% higher than the prior art test specimens having free ends. In addition, photoelastic studies indicate an extremely uniform stress distribution of the new type specimens, whereas the prior art specimens with the free ends had an extremely non-uniform stress distribution. This results in the obtainment of tensile values which are representative of the actual tensile strength of the panel in its original construction.

Although we have described our invention with a certain degree of particularity, it is understood that the present disclosure has been made only by way of example and that numerous changes in materials and details of construction may be restored to without departing from the spirit and scope of the invention as hereinafter claimed.

Having described our invention, we claim:

1. A method of fabricating tensile test specimens for sheet compositions that are made up of a plurality of bonded layers of unwoven material reinforced with unidirectional continuous fibers and positioned in a manner that cross plied the fibers of the innerfacing layers comprising the steps of
    (a) wrapping a ribbon width of the bondable unwoven material spirally around a non-bonding mandrel
    (b) wrapping additional layers of the ribbon with of bondable unwoven material spirally over the first layer of unwoven material in a direction opposite to the direction of the preceding layer and at an angle thereto that is equal to the angle of the fiber cross-plying of the duplicated sheet composition;
    (c) removing the hollow wound bondable core from the mandrel;
    (d) pressing the bondable core to a flat configuration, and
    (e) curing the flattened core.

2. A method for the fabrication of tensile test specimens according to the claim 1 wherein the mandrel is rendered unbonding by initially covering it with a layer of non-bondable material.

3. A method for the fabrication of tensile test specimens according to claim 1 wherein the windings are at an angle of 45° with respect to the mandrel axis.

4. A method for the fabrication of tensile test specimens according to claim 1 wherein the width of the successively wrapped ribbon layers is increased to correct variations in the fiber cross-plying angle caused by increased thickness of the mandrel and windings.

5. A method for the fabrication of tensile test specimens according to claim 4 wherein the width of the initial ribbon layer is equal to the diameter of the mandrel multiplied by the cosine of ½ the angle between cross plies.

6. A method for the fabrication of tensile test specimens according to claim 5 wherein the width of successive ribbon layers increases by twice the thickness of the ribbon.

References Cited
UNITED STATES PATENTS

| | | | |
|---|---|---|---|
| 2,815,043 | 12/1957 | Kleiner et al. | 156—195 |
| 2,943,540 | 7/1960 | McBain | 156—195 |
| 1,515,792 | 11/1924 | Respess | 156—190 |

GEORGE F. LESMES, Primary Examiner

J. J. BELL, Assistant Examiner

U.S. Cl. X.R.

156—194, 195; 161—47, 59